(12) United States Patent
Niessner et al.

(10) Patent No.: US 9,562,510 B2
(45) Date of Patent: Feb. 7, 2017

(54) SPARK PLUG FOR A GAS-POWERED INTERNAL COMBUSTION ENGINE

(71) Applicant: Federal-Mogul Ignition GmbH, Neuhaus-Schierschnitz (DE)

(72) Inventors: Werner Niessner, Steinheim (DE); Anko Ernst, Salem (DE)

(73) Assignee: FEDERAL-MOGUL IGNITION GmbH, Neuhaus-Schierschnitz (DE)

( * ) Notice: Subject to any disclaimer, the term of this patent is extended or adjusted under 35 U.S.C. 154(b) by 197 days.

(21) Appl. No.: 14/465,026

(22) Filed: Aug. 21, 2014

(65) Prior Publication Data
US 2015/0059456 A1    Mar. 5, 2015

(30) Foreign Application Priority Data
Aug. 27, 2013    (DE) .......................... 10 2013 109 278

(51) Int. Cl.
*G01M 15/08*    (2006.01)
*F02P 15/00*    (2006.01)
(Continued)

(52) U.S. Cl.
CPC ........... *F02P 15/006* (2013.01); *F02D 35/023* (2013.01); *G01M 15/08* (2013.01); *H01T 13/32* (2013.01);
(Continued)

(58) Field of Classification Search
USPC ............................ 73/114.18, 114.19, 114.21
See application file for complete search history.

(56) References Cited

U.S. PATENT DOCUMENTS 6,064,144 A * 5/2000 Knoll .................... H01T 13/467
                                                           313/138
6,204,594 B1 * 3/2001 Ingham ................... G01L 23/22
                                                           313/118
(Continued)

FOREIGN PATENT DOCUMENTS

DE    3331114 A1    3/1985
DE    3331114 C2    4/1992
(Continued)

OTHER PUBLICATIONS 10 2013 109 278.0 German Office Action dated Apr. 11, 2014, 8 pages.
(Continued)

*Primary Examiner* — Eric S McCall
(74) *Attorney, Agent, or Firm* — Reising Ethington, P.C.

(57) ABSTRACT

A spark plug for a stationary, gas-powered internal combustion engine, having a metallic body, an insulator mounted in a passage of the body, a center electrode passing through the insulator, a ground electrode mounted on the body that, together with the center electrode, forms a spark air gap, and a cap attached to the body. The cap shields the center and ground electrodes from the combustion chamber after the spark plug is installed in a combustion chamber of the internal combustion engine, and that, together with the body of the spark plug, forms a prechamber in which the center and ground electrodes are located. The cap has at least one opening that permits gas exchange between the prechamber and the space outside of the prechamber. A sensor receiving space is provided in the body of the spark plug, which space opens into the prechamber and serves to receive a pressure sensor in a replaceable manner, and a connecting channel for routing a connecting line of the pressure sensor leads from
(Continued)

the sensor receiving space to the end of the body opposite the cap.

14 Claims, 1 Drawing Sheet

(51) Int. Cl.

| | | |
|---|---|---|
| H01T 13/32 | (2006.01) | |
| H01T 13/41 | (2006.01) | |
| H01T 13/40 | (2006.01) | |
| H01T 13/54 | (2006.01) | |
| F02D 35/02 | (2006.01) | |
| F02P 13/00 | (2006.01) | |
| G01L 23/22 | (2006.01) | |
| F02B 19/10 | (2006.01) | |

(52) U.S. Cl.
CPC ............ H01T 13/40 (2013.01); H01T 13/41 (2013.01); H01T 13/54 (2013.01); *F02B 19/1014* (2013.01); *F02P 13/00* (2013.01); *F02P 15/001* (2013.01); *G01L 23/22* (2013.01)

(56) References Cited

U.S. PATENT DOCUMENTS

| | | | |
|---|---|---|---|
| 6,952,948 B2 | 10/2005 | Herbert et al. | |
| 7,415,877 B2* | 8/2008 | Okumura | G01N 27/407 73/29.05 |
| 8,350,457 B2 | 1/2013 | Thomas | |
| 2002/0195917 A1* | 12/2002 | Hiramatsu | H01T 21/02 313/144 |
| 2004/0045345 A1* | 3/2004 | Herbert | G01L 23/221 73/114.19 |
| 2008/0218052 A1 | 9/2008 | Winklhofer | |
| 2009/0235889 A1* | 9/2009 | Yamada | H01T 13/50 123/143 B |
| 2011/0101844 A1* | 5/2011 | Glaser | F02D 35/023 313/141 |
| 2011/0148274 A1* | 6/2011 | Ernst | H01T 13/467 313/141 |
| 2015/0020574 A1* | 1/2015 | Motomura | G01N 15/0656 73/23.31 |

FOREIGN PATENT DOCUMENTS

| | | |
|---|---|---|
| DE | 10035536 A1 | 2/2002 |
| DE | 10144976 A1 | 4/2003 |
| DE | 102012102010 A1 | 12/2012 |
| JP | 2006324120 A | 11/2006 |
| WO | WO9731251 A1 | 8/1997 |

OTHER PUBLICATIONS

German Office Action for Application No. 102013109278.0 Dated Oct. 7, 2016, 8 pages.

* cited by examiner

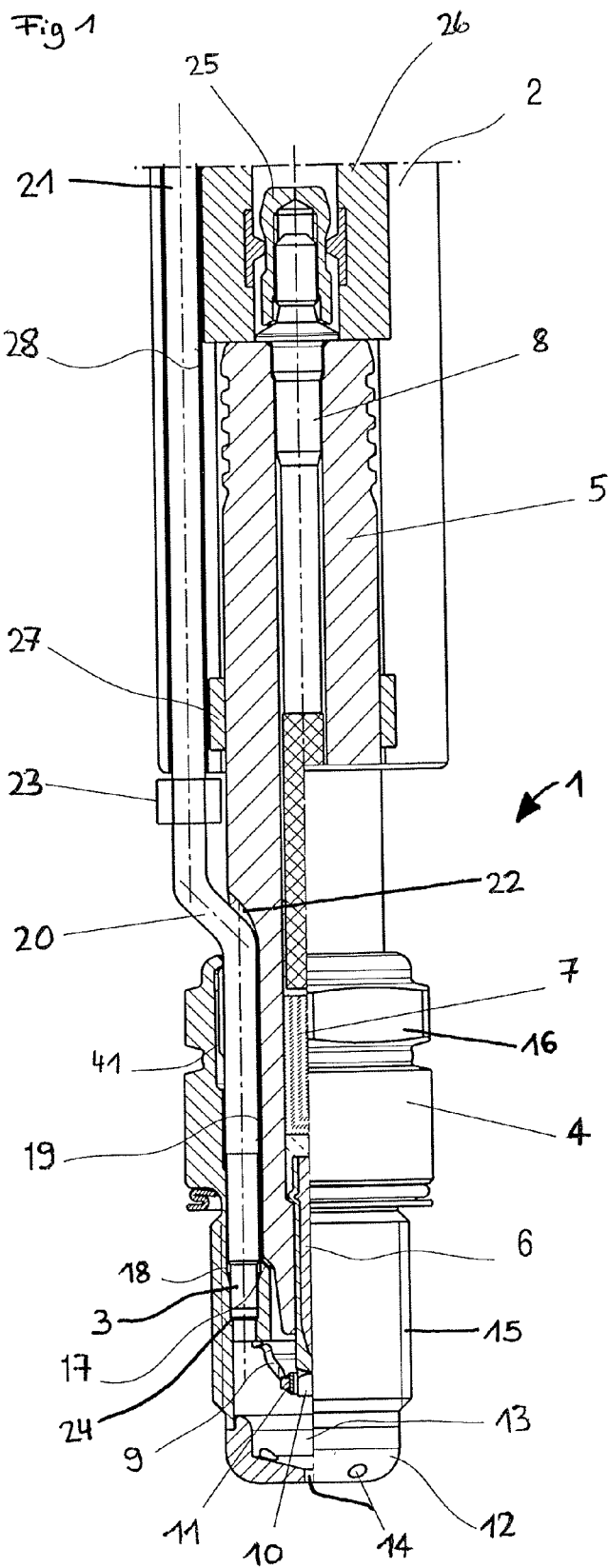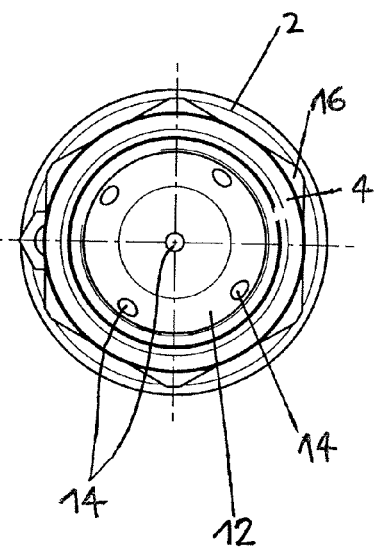

SPARK PLUG FOR A GAS-POWERED INTERNAL COMBUSTION ENGINE

This Application claims the benefit of DE Application No. 102013109278.0 filed on Aug. 27, 2013, the contents of which are hereby incorporated by reference in their entirety.

FIELD

The invention concerns a spark plug with the features specified in the preamble to claim 1.

BACKGROUND

A spark plug of this nature is disclosed in DE 101 44 976 A1. In this spark plug, the center electrode and the ground electrode do not project directly into the combustion chamber of the internal combustion engine, but instead into a prechamber that is formed at the forward end of the spark plug and communicates with the combustion chamber of the internal combustion engine through one or more openings. As a result of the openings in the prechamber, an exchange of gas is possible between the prechamber and the combustion chamber. Spark plugs of this type, which are also known as prechamber spark plugs, are used for the ignition of lean fuel/air mixtures in stationary, gas-powered internal combustion engines. A fuel/air mixture is referred to as lean when the ratio, lambda, of the quantity of air actually present in the combustion chamber to the quantity of air stoichiometrically required for complete combustion of the fuel is greater than 1, where lambda values of 1.6 to 1.7 are desired. In the compression stroke of the internal combustion engine, an ignitable mixture is introduced into the prechamber through the openings of the prechamber. In terms of its function, the prechamber is a precombustion chamber. The ignitable gas/air mixture flowing into the prechamber is first ignited in the prechamber by means of an ignition spark produced between the center electrode and the ground electrode of the spark plug. The flame produced in the prechamber is ejected from the prechamber through the openings therein as a result of the pressure of the combustion arising in the prechamber, and ignites the lean fuel/air mixture present outside the prechamber in the combustion chamber of the internal combustion engine.

Stationary, gas-powered internal combustion engines are designed for a very long service life and accordingly are also in use for long time periods. In order to optimize combustion and running performance, as well as to reduce fuel consumption and pollutant emissions, it is desirable to obtain information about the combustion taking place in the combustion chamber and to adjust the engine controller on the basis of this information. In stationary, gas-powered internal combustion engines that have already been in use for a relatively long time, there oftentimes is still no way of acquiring information from the combustion chamber during operation, since no appropriate sensors or channels are provided in the combustion chamber. It is very resource-intensive to retrofit openings or channels terminating in the combustion chamber, so retrofitting is not possible in practical terms.

SUMMARY

A potential object of the present invention is to create a simple and economical possibility in a stationary, gas-powered internal combustion engine by which means information on the combustion taking place in the combustion chamber can be acquired and made available to an engine controller, and which can be easily retrofitted on existing internal combustion engines.

This object is attained by a spark plug with the features specified in claim 1. Advantageous further developments of the invention are the subject matter of the dependent claims.

The spark plug according to the invention may have a metallic body, an insulator mounted in a passage of the body, a center electrode passing through the insulator, and a ground electrode mounted on the body that, together with the center electrode, forms a spark air gap. The spark plug has a cap that is attached to the body, that shields the center electrode and the ground electrode from the combustion chamber after the spark plug is installed in a combustion chamber of the internal combustion engine, and that, together with the body, forms a prechamber in which the center electrode and ground electrode are located. The cap has at least one opening that permits gas exchange between the prechamber and the space outside of the prechamber. Located in the body of the spark plug is a sensor receiving space, which opens into the prechamber. The sensor receiving space serves to receive a pressure sensor in a replaceable manner. The spark plug has a connecting channel for routing a connecting line of the pressure sensor. The connecting channel leads from the end of the body opposite the cap to the sensor receiving space. The pressure prevailing in the prechamber can be measured using the pressure sensor. A pressure signal corresponding to the pressure in the prechamber is supplied to an engine controller via the connecting line.

The invention may have some combination of the following important advantages:

Surprisingly, it has become apparent that it is advantageous to measure and analyze the pressure in the prechamber of the spark plug. Even though the prechamber only communicates with the combustion chamber of the internal combustion engine through relatively small openings, and the combustion processes in the two chambers take place with a time offset, as discussed above, it has surprisingly become apparent that very good conclusions regarding the processes in the combustion chamber outside of the prechamber can be drawn from the progression of pressure in the prechamber. With the invention, it is thus no longer necessary for measurement purposes to provide additional bores or channels in the internal combustion engine that communicate directly with the combustion chamber.

The spark plug according to the invention may be suitable for retrofitting in stationary, gas-powered internal combustion engines that do not yet have measuring devices. Older internal combustion engines can be modernized easily with the spark plug according to the invention and a new control unit, without additional mechanical changes to the internal combustion engine being necessary. The invention thus creates a very simple and economical retrofit option. The retrofitting makes possible optimized operation of the internal combustion engine in which fuel consumption and/or pollutant emissions can be reduced.

As a result of the fact that the sensor receiving space is designed such that it can receive a pressure sensor in a replaceable manner, maintenance costs can be kept low. Spark plugs are subject to wear of their electrodes and must be replaced at regular intervals. Spark plugs for stationary, gas-powered internal combustion engines are significantly more expensive than the automotive spark plugs without prechambers that are produced in very large quantities. During a spark plug replacement, which is required after several thousand hours of operation, the pressure sensor can be removed from the worn spark plug and installed in the new spark plug.

The ignition system is easy to handle without requiring additional installation effort in the cylinder head.

In WO 97/31251 A1, which is of a different class and over 15 years old, a spark plug with no prechamber is described in which a replaceable pressure sensor is disclosed for direct measurement of the pressure in the combustion chamber. Such spark plugs with a replaceable pressure sensor and no prechamber have not found acceptance in practice to this day, however. In addition, for reasons of cost, spark plugs with a permanently installed pressure sensor and no prechamber are used solely for testing purposes, but not in automotive mass production, however.

In an embodiment of the invention, provision is made that the connecting channel can be composed along its circumference partially of a surface of the insulator and partially of a surface of the body. In this design, viewed in a cross-section through the connecting channel, the circumferential surface bordering the connecting channel is composed partially of the insulator and partially of the body of the spark plug. The connecting channel is located between the insulator and the body. This embodiment has the advantage that it is not necessary to introduce a bore either in the insulator or in the body of the spark plug. A portion of the connecting channel is formed in both the insulator and in the body. The complete connecting channel comes into being only after installation of the insulator in the spark plug body through interaction of the corresponding surface of the insulator and the corresponding surface of the body. The shaping in the insulator and in the spark plug body required for the connecting channel can be produced very simply and inexpensively in this way. It is especially advantageous for the insulator to have on its exterior a groove extending in the longitudinal direction of the spark plug, which, together with the body, forms the connecting channel. The groove can be made in the ceramic of the insulator even before the sintering process. In this way, it is possible to avoid a resource-intensive grinding process of the ceramic of the insulator for producing the connecting channel, such as is disclosed in DE 100 35 536 A1, for example. It is especially advantageous for the groove in the insulator to begin at a shoulder-like bearing surface of the insulator where the insulator rests against a step in the passage of the body with the interposition of a seal. The groove preferably can extend over the full length of the connecting channel. It is preferred for the connecting channel to extend in a straight line in the spark plug. The routing of the connecting line and the replaceability of the pressure sensor are greatly simplified by this means.

In another embodiment of the invention, provision can be made for the center electrode to be tipped at its end projecting past the insulator with a precious metal or a precious metal alloy. The ground electrode can surround the end of the center electrode tipped with a precious metal or a precious metal alloy, and can be tipped annularly on its inner side facing the center electrode with a precious metal or a precious metal alloy.

The surfaces of the center electrode and ground electrode facing one another and composed of the precious metal or precious metal alloy preferably are coaxially arranged cylindrical surfaces. This design of the center and ground electrodes produces an annular spark gap, and very long service lives of the electrodes can be achieved. Preferably platinum, iridium, or an alloy based on one of these two precious metals is used for tipping the electrodes.

It can be advantageous for the center electrode to be centrally arranged in the body. The insulator can be centrally arranged in the body and, in particular, can be arranged to be coaxial to the center electrode. The body of the spark plug can have an external thread for screwing the spark plug into the internal combustion engine. Preferably, the center electrode can be arranged to be coaxial to the external thread. A ground electrode annularly surrounding the center electrode can be arranged to be coaxial to the external thread. This permits a central spark gap arrangement in the prechamber. Furthermore, it also allows a central installation of the spark plug in the cylinder head so that the spark plug connector can be fitted centrally onto the spark plug. A central spark position in the prechamber is advantageous to ensure good ignition inside the prechamber.

In another advantageous embodiment, the pressure sensor located in the sensor receiving space can contain a piezo element and/or a pressure membrane. Preferably, the pressure sensor is connected to an optical line, for example an optical fiber line, which is routed through the connecting channel. A coaxial connector can be provided, which is coaxial to the center conductor of the spark plug. The sensor receiving space can be located in a region of the body that, in the longitudinal direction of the spark plug, lies between the prechamber and a seal located between the insulator and the body. The end face of the pressure sensor facing the prechamber preferably terminates flush with the surface of the body that adjoins the pressure sensor and that forms the prechamber. As a result, the pressure in the prechamber can act directly and unimpeded on the pressure sensor. In this way, very precise sensing of the pressure in the prechamber is possible.

For simple mounting and easy replaceability of the pressure sensor, the sensor receiving space advantageously includes an internal thread. The sensor receiving space can include a conical seal face. Alternatively, a seal ring, in particular a flat seal ring, can be arranged between the pressure sensor and the body of the spark plug. A seal is achieved between the sensor receiving space and the connecting channel, so that the pressure arising in the prechamber cannot escape through the connecting channel for the pressure sensor. An internal thread in the sensor receiving space in combination with a conical seal face permits especially simple replaceability of the pressure sensor.

DRAWINGS

Additional advantages and features of the invention are evident from the description below of an exemplary embodiment in conjunction with the figures. They show:

FIG. 1 shows a spark plug according to the invention, with prechamber and replaceable pressure sensor, shown partially in longitudinal section, and FIG. 2 shows a view from below of the spark plug from FIG. 1.

DESCRIPTION

Shown in FIGS. 1 and 2 is a prechamber spark plug 1, a part of a spark plug connector 2 pushed onto the spark plug 1, and a pressure sensor 3 arranged in the spark plug 1. The spark plug 1 has a metallic body 4 and a ceramic insulator 5 mounted in a passage 41 of the body 4. A center electrode 6 passes through the insulator 5, and is connected in an electrically conductive manner to an igniter 8 by means of an electrically conductive fused glass element 7. The fused glass element 7 forms a pressure-tight ceramic-to-metal connection. Mounted on the body 4 is a ground electrode 9 that, together with the center electrode 6, forms a spark air gap.

At its end projecting past the insulator 5, the center electrode 6 is tipped with a precious metal 10. The ground electrode 9 surrounds the end of the center electrode 6 tipped with a precious metal alloy 10, and is tipped annularly on its inner side facing the center electrode 6 with a precious metal alloy 11. The surfaces of the center electrode 6 and ground electrode 9 facing one another and composed of the precious metals 10, 11 are coaxially arranged cylindrical surfaces.

Attached to the body 4 is a cap 12 that shields the center electrode 6 and the ground electrode 9 from the combustion chamber after the spark plug 1 is installed in a combustion chamber of the internal combustion engine, and that, together with the body 4 of the spark plug 1, forms a prechamber 13 in which the precious metal alloy 10 of the center electrode 6 and the precious metal alloy 11 of the ground electrode 9 are located. The cap 12 has openings 14 that permit gas exchange between the prechamber 13 and the space outside of the prechamber.

The body 4 has an external thread 15 for screwing the spark plug 1 into the internal combustion engine. For the purpose of screwing in, the body 4 also has a hex 16 for placement of a driving tool. The center electrode 6 is arranged to be coaxial to the external thread 15 in the prechamber 13. The ground electrode 9 is likewise arranged to be coaxial to the external thread 15 in the prechamber 13. This arrangement produces a central spark position, which permits ignition from nearly the center of the prechamber 13, and thus ensures reliable burn-through of the combustion gas.

The insulator 5 and the body 4 are sealed with respect to one another by a seal 17, so that the pressure arising in the prechamber 13 does not escape through the spark plug 1. A shoulder-like bearing surface of the insulator 5 rests against the seal 17. The body 4 rests against the seal 17 by means of a step provided in the passage 41 of the body 4.

Provided in the body 4 of the spark plug 1 is a sensor receiving space 18 for receiving the pressure sensor 3. The pressure sensor 3 is located in the sensor receiving space 18 in a replaceable manner. The sensor receiving space 18 is located in a region of the body 4 that, in the longitudinal direction of the spark plug 1, lies between the pre-chamber 13 and the seal 17 located between the insulator 5 and the body 4. The sensor receiving space 18 opens into the prechamber 13.

The pressure sensor 3 is contained in a sensor assembly 20, which also contains a connecting line 21. The spark plug 1 has a connecting channel 19 for routing the connecting line 21 of the pressure sensor 3. The connecting channel 19 extends from the end of the body 4 opposite the cap 12 to the sensor receiving space 18. The insulator 5 has a groove 22 extending in the longitudinal direction of the spark plug 1 that, together with an inside surface of the passage 41 in the body 4, forms the connecting channel 19. As a result, the connecting channel 19 is composed along its circumference partially of a surface of the insulator 5 and partially of a surface of the body 4.

The sensor receiving space 18 includes an internal thread, which the pressure sensor 3 is screwed into. The sensor assembly 20 can have a screw device 23, for example a hex, for screwing it on and off. Furthermore, the sensor receiving space 18 includes a conical seal face 24 against which a suitably shaped seal face of the pressure sensor 3 bears with a sealing action. In addition, a seal ring, which is not shown, can be arranged between the body 4 and the pressure sensor 3.

The pressure sensor 3 is preferably an optically operating pressure sensor with a pressure membrane that is supplied with light through optical fibers in the connecting line 21. The light is reflected at the pressure membrane, and is routed via optical fibers in the connecting line 21 to a receiver provided in a control unit. Changing pressures in the pre-chamber 13 result in different deformations of the pressure membrane, causing the light reflections at the pressure membrane to change.

The spark plug 1 is supplied with ignition voltage through the high-voltage spark plug connector 2. The spark plug connector 2 is pushed onto the end of the insulator 5 that projects from the body 4. The igniter 8 is provided with a terminal nut 25 that forms the high-voltage interface together with a plug-in unit 26 of the spark plug connector 2. An insulating part 27 is provided in the spark plug connector 2 for electrical insulation. The spark plug connector 2 is provided with a slot 28 in which the connecting line 21 is routed. The connecting line 21 leads to an electronic analysis unit with an optocoupler, which can be arranged at the back end of the spark plug connector 2 in a manner not shown, and which analyzes the pressure signal from the pressure sensor 3 and makes it available to the engine controller. The connecting line 21 can be disconnected from the electronic analysis unit when the sensor assembly 20 is to be installed in a different spark plug.

LIST OF REFERENCE NUMBERS 1 prechamber spark plug
2 spark plug connector
3 pressure sensor
4 body
5 insulator
6 center electrode
7 fused glass element
8 igniter
9 ground electrode
10 precious metal alloy
11 precious metal alloy
12 cap
13 prechamber
14 openings
15 external thread
16 hex
17 seal
18 sensor receiving space
19 connecting channel
20 sensor assembly
21 connecting line
22 groove
23 screw device
24 conical seal face
25 terminal nut
26 plug-in unit
27 insulating part
28 slot
41 passage It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. Spark plug for a stationary, gas-powered internal combustion engine,
    having a metallic body;
    having an insulator mounted in a passage of the body;
    having a center electrode passing through the insulator;
    having a ground electrode mounted on the body that, together with the center electrode, forms a spark air gap;
    and having a cap that is attached to the body, that shields the center electrode and the ground electrode from the combustion chamber after the spark plug is installed in a combustion chamber of the internal combustion engine, and that, together with the body of the spark plug, forms a prechamber in which the center electrode and the ground electrode are located;
    wherein the cap has at least one opening that permits gas exchange between the prechamber and the space outside of the prechamber;
    characterized in that a sensor receiving space is provided in the body of the spark plug, which space opens into the prechamber and serves to receive a pressure sensor in a replaceable manner;
    and in that the spark plug has a connecting channel for routing a connecting line of the pressure sensor that leads from the sensor receiving space to the end of the body opposite the cap.

2. Spark plug according to claim 1, in which the center electrode is tipped at its end projecting past the insulator with a precious metal or a precious metal alloy; and in which the ground electrode surrounds the end of the center electrode tipped with a precious metal or a precious metal alloy, and is tipped annularly on its inner side facing the center electrode with a precious metal or a precious metal alloy;
    wherein the surfaces of the center electrode and ground electrode facing one another and composed of the precious metal or precious metal alloy are coaxially arranged cylindrical surfaces.

3. Spark plug according to claim 1, in which the center electrode is centrally arranged in the body.

4. Spark plug according to claim 1, in which the sensor receiving space is located in a region of the body that, in the longitudinal direction of the spark plug, lies between the prechamber and a seal located between the insulator and the body.

5. Spark plug according to claim 1, in which the sensor receiving space includes an internal thread.

6. Spark plug according to claim 1, in which the sensor receiving space includes a conical seal face.

7. Spark plug according to claim 1, in which the connecting channel is composed along its circumference partially of the insulator and partially of the body.

8. Spark plug according to claim 7, in which the insulator has a groove extending in the longitudinal direction of the spark plug that, together with the body, forms a part of the connecting channel.

9. Spark plug according to claim 8, in which the groove in the insulator begins at a shoulder-like bearing surface of the insulator, with which the insulator rests against a step in the passage of the body with the interposition of a seal.

10. Spark plug according to claim 1, in which a pressure sensor for measuring the pressure in the prechamber is arranged in the sensor receiving space in a replaceable manner.

11. Spark plug according to claim 10, in which the end face of the pressure sensor facing the prechamber terminates flush with the surface of the body that adjoins the pressure sensor and that forms the prechamber.

12. Spark plug according to claim 10, in which the pressure sensor contains a piezo element and/or a pressure membrane.

13. Spark plug according to claim 10, which contains at least one optical fiber line connected to the pressure sensor, which line runs through the connecting channel.

14. Spark plug according to claim 10, in which a seal ring is arranged between the pressure sensor and the body.

* * * * *